United States Patent
Petronijevic et al.

(10) Patent No.: US 9,436,714 B2
(45) Date of Patent: Sep. 6, 2016

(54) SYSTEM AND METHOD FOR SERVICE ADVERTISING AND DISCOVERY

(71) Applicant: Research In Motion Limited, Waterloo (CA)

(72) Inventors: Dejan Petronijevic, Toronto (CA); Piotr Madej, Mississauga (CA)

(73) Assignee: BlackBerry Limited, Waterloo (CA)

( * ) Notice: Subject to any disclaimer, the term of this patent is extended or adjusted under 35 U.S.C. 154(b) by 367 days.

(21) Appl. No.: 13/837,622

(22) Filed: Mar. 15, 2013

(65) Prior Publication Data

US 2014/0122481 A1  May 1, 2014

Related U.S. Application Data

(60) Provisional application No. 61/719,625, filed on Oct. 29, 2012.

(51) Int. Cl.
*G06F 17/30* (2006.01)
*G06F 17/00* (2006.01)
(Continued)

(52) U.S. Cl.
CPC ......... *G06F 17/30312* (2013.01); *G06Q 10/06* (2013.01); *G06Q 10/10* (2013.01); *G06Q 50/01* (2013.01)

(58) Field of Classification Search
CPC ............... G06Q 30/0207; G06Q 30/0283; G06Q 30/0284; G06Q 40/12; G06Q 10/087; G06Q 20/04; G06Q 10/0833; G06Q 20/10; G06Q 20/32; G06Q 30/0633; G06Q 10/08; G06Q 20/02; G06Q 20/22; G06Q 20/223; G06Q 20/24; G06Q 20/28; G06Q 20/3223
USPC .............................................. 707/899; 726/4
See application file for complete search history.

(56) References Cited

U.S. PATENT DOCUMENTS 7,647,635 B2   1/2010  Chen et al.
8,499,037 B2*  7/2013  Ramnani ............... G06Q 30/02
                                                  709/204
(Continued)

FOREIGN PATENT DOCUMENTS

EP   1 624 710 A1     2/2006
EP     2328120 A1     6/2011
WO  2004/040929 A1    5/2004
WO  2004/062248 A1    7/2004

OTHER PUBLICATIONS

Qwerly: How it works; available online Jul. 12, 2011; http://web.archive.org/web/20110712195711/http://qwerly.com/how-qwerly-works, pp. 1-2.

(Continued)

*Primary Examiner* — Yicun Wu
(74) *Attorney, Agent, or Firm* — Ridout & Maybee LLP

(57) ABSTRACT

A centralised identity and capability resolution server (ICRS) keeps track of which user or subscriber is logged in on every device in a communications ecosystem and maintains the state of user, device and service relationships based on multiple external events. Each subscriber is provided with a unique identifier within the ecosystem or unique ecosystem identifier. The ICRS establishes an association between the service identifier, user and particular device that a user is using for that service. The devices within the ecosystem are configured to inform the ICRS of new accounts, or changes affecting existing accounts, such as cancelling of an account or loss of device. In that way, the ICRS has up to date state of the relationships between user or subscriber identifiers, devices, and various service identifiers. This enables ICRS to retrieve any identifier associated to the subscriber when any other identifier belonging to the user is provided.

18 Claims, 7 Drawing Sheets

(51) Int. Cl.
*G06Q 10/06* (2012.01)
*G06Q 10/10* (2012.01)
*G06Q 50/00* (2012.01)

(56) References Cited

U.S. PATENT DOCUMENTS

| | | | |
|---|---|---|---|
| 8,789,147 B1 * | 7/2014 | Agarwal et al. | 726/4 |
| 2008/0120271 A1 | 5/2008 | Hunt et al. | |
| 2010/0161566 A1 | 6/2010 | Adair et al. | |
| 2012/0215772 A1 | 8/2012 | Eshwar et al. | |

OTHER PUBLICATIONS

Kwak et al.; Connecting Users with Similar Interests Across Multiple Web Services; Computer Science Department, KAIST: Proceedings of the Third International ICWSM Conference; Yuseong-gu, Korea, 2009; pp. 246-249.

European Search Report from European Patent Application No. 13159558.9 dated Jan. 8, 2014, 6 pages.

* cited by examiner

US 9,436,714 B2

SYSTEM AND METHOD FOR SERVICE ADVERTISING AND DISCOVERY

TECHNICAL FIELD

The present disclosure relates generally to a system, method and server for tracking and managing services for subscribers in a wireless ecosystem.

BACKGROUND

A mobile device user typically uses multiple communication/social media services, such as but not limited to BBM™ (Blackberry™ Messaging), instant messaging, Facebook™, email, Twitter™, Scoreloop™, Linkedin™. Increasingly, mobile users use more than one device, and they do not necessarily access the same set of services on each of their devices. Mobile users typically have different identifiers or account ids for those communication/social services. Two users may know about each other through one of the specialized services (e.g. gaming) and want to extend the connection to other services (e.g. instant messaging).

BRIEF DESCRIPTION OF THE DRAWINGS

Like reference numerals are used in the drawings to denote like elements and features.

DETAILED DESCRIPTION OF EXAMPLE EMBODIMENTS

Figure 1:
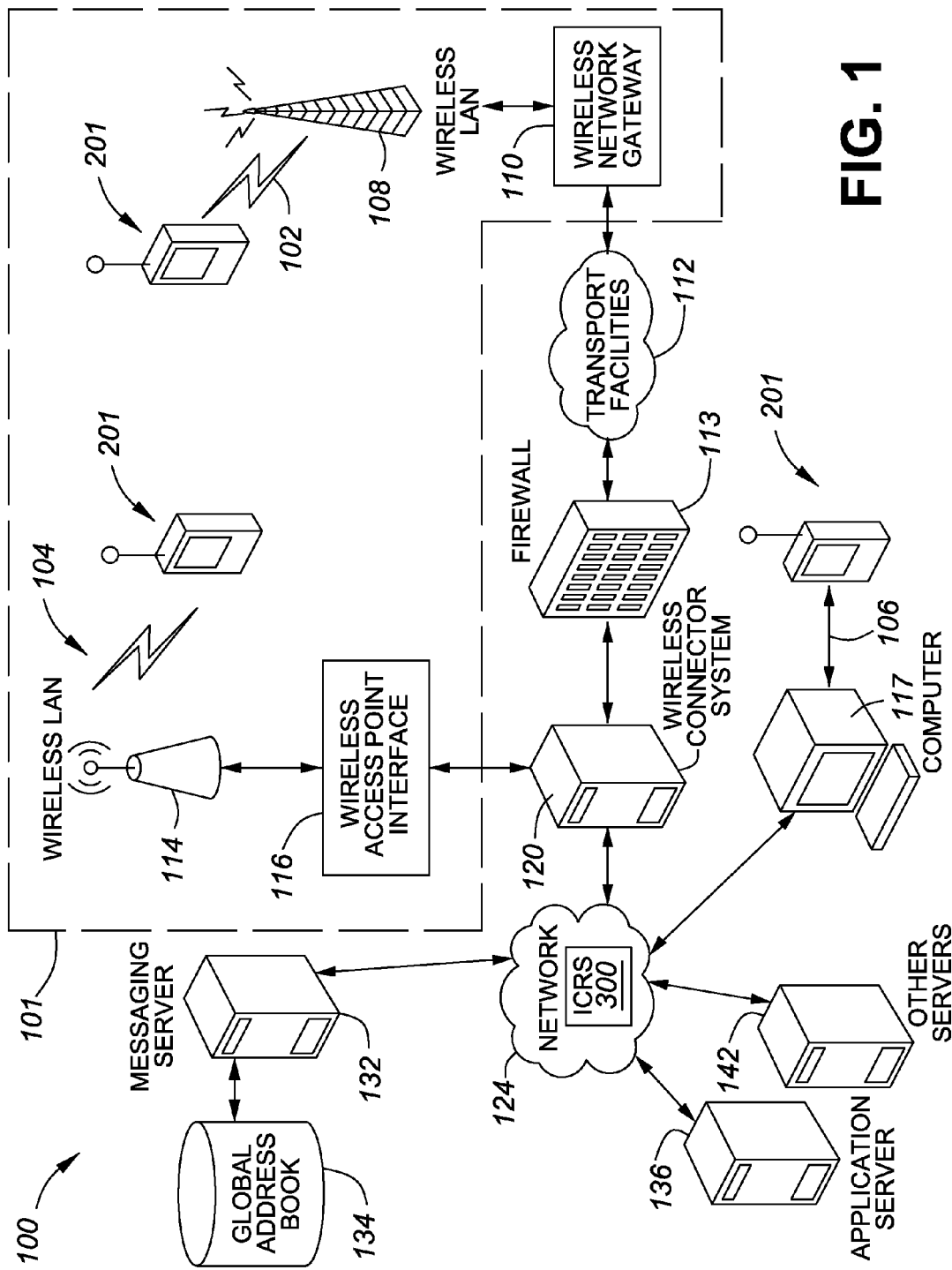
FIG. 1 is a block diagram illustrating a communication system including a mobile communication device in which example embodiments of the present disclosure can be applied.

The present disclosure enables the discovery of a specific communication/social media identifier for a user (e.g. BBM registration ID) based on a known identifier for the same user for another service (e.g. Scoreloop gaming ID).

According to an embodiment of the present disclosure there is provided a centralised identity and capability resolution server in a communications ecosystem, the communications ecosystem comprising one or more electronic devices operating within one or more communication networks, the centralised identity and capability resolution server comprising: a communication interface for communicating with devices within the communications ecosystem; a processor configured to upon receiving notification through the communication interface of a new subscriber in the ecosystem, creating a new database entry for a unique ecosystem identifier in the database for the new subscriber, the database entry being created in a database stored in a memory and the database being a database of unique ecosystem identifiers for subscribers within a communications ecosystem, each entry in the database being for a unique ecosystem identifier comprising account information associated with the unique ecosystem identifier, the account information including at least one device identifier, at least one service identifier, and at least one account identifier for the service; and upon receiving notification of any account information associated with the new subscriber, entering the account information into the database in association with the unique ecosystem identifier.

According to another embodiment of the present disclosure there is provided a communications ecosystem comprising one or more networks; one or more electronic devices, each registered for service over at least one of the one or more networks and a centralised identity and capability resolution server. The centralised identity and capability resolution server comprises a memory having stored thereon a database of unique ecosystem identifiers for subscribers within the communications ecosystem, each entry in the database being for a unique ecosystem identifier comprising account information associated with the unique ecosystem identifier; a communication interface for communicating with devices within the communications ecosystem; and a processor. The processor is configured to upon receiving notification through the communication interface of a new subscriber in the ecosystem, creating a new database entry for a unique ecosystem identifier in the database for the new subscriber, each entry in the database for a unique ecosystem identifier comprising account information associated with the unique ecosystem identifier, the account information including at least one device identifier, at least one service identifier, and at least one account identifier for the service; and upon receiving notification of any account information associated with the new subscriber identifier, entering the account information into the database entry in association with the ecosystem identifier.

According to another embodiment of the present disclosure there is provided a method of resolving capabilities and identities within a communications ecosystem. The method comprises upon receiving notification at a centralised identity and capability resolution server of a new subscriber in the ecosystem, creating a new database entry for a unique ecosystem identifier in a database of unique ecosystem identifiers for subscribers within a communications ecosystem, each entry in the database for a unique ecosystem identifier comprising account information associated with the unique ecosystem identifier, the account information including at least one device identifier, at least one service identifier, and at least one account identifier for the service; and upon receiving notification of any account information at the centralised capability and identity resolution server associated with the new subscriber identifier, entering the account information into the database entry in association with the ecosystem identifier.

According to another embodiment of the present disclosure there is provided a method of resolving capabilities and identities within a communications ecosystem. The method comprises upon receiving notification at a centralised identity and capability resolution server of a new subscriber in the ecosystem, creating a new database entry for a unique ecosystem identifier in a database of unique ecosystem identifiers for subscribers within a communications ecosystem, each entry in the database for a unique ecosystem identifier comprising account information associated with the unique ecosystem identifier, the account information including at least one device identifier, at least one service identifier, and at least one account identifier for the service; and upon receiving notification of any account information at the centralised capability and identity resolution server associated with the new subscriber identifier, entering the account information into the database entry in association with the ecosystem identifier.

A centralised identity and capability resolution server keeps track of which user or subscriber is logged in on every device in a communications ecosystem and maintains the state of user-device relationship based on multiple external events (e.g. login, device wipe, carrier actions etc.). Each subscriber is provided with a unique identifier within the ecosytem. This identifier will be referred to within this disclosure as a unique ecosystem identifier. A communications ecosystem comprises one or more wireless or wired networks, one or more electronic devices operating within one of the networks, one or more services provided over at least one of the networks, and subscribers. In some embodiments, the ecosystem also includes servers which perform functions including but not limited to providing services and managing devices and subscribers and their relationships. The services provided within the ecosystem may comprise communication or social media services. Each communication/social media service client is provided with a service identifier for the respective service. The centralised identity and capability resolution server establishes an association between the service identifier, user and particular device that a user is using for that service. The devices within the ecosystem are configured to inform the centralised identity and capability resolution server of new accounts, or changes affecting existing accounts, such as cancelling of an account or conditions which may indicate a loss of device. In that way, the centralised identity resolution server has up to date state of the relationships between user or subscriber identifiers, devices, and various service identifiers. This enables the centralised identity and capability resolution server to retrieve any identifier associated to the subscriber when any other identifier belonging to the user is provided.

Embodiments of the centralised identity and capability resolution server dynamically adjust relationships between user/subscriber, device and service (e.g. Facebook). If a device is lost/stolen/wiped or changes owner, then the centralised identity and capability resolution server may notify the service providers such as BBM/Push Server/Facebook, etc of that fact. In some embodiments, the centralised identity resolution server is also a mechanism for social media discovery and integration.

The following set of use-cases are made possible by using the centralised identifier resolution server described herein:

a. Address Book: Allows for populating Social Media account information (Twitter/Facebook/LinkedIn etc) based on a unrelated information (i.e. subscribers phone number/device identifier, such as IMEI (International Mobile Equipment Identity), IMSI (International Mobile Subscriber Identity), etc).

b. Social Media: Invitation to one social media service can be sent to subscribers via other Social Networks. For example, when inviting a contact from an address book to BBM/Twitter/Facebook, the invitation can be sent via any available social media channel in addition to or instead of a regular email channel.

c. Social Media: Converse with contact/friends in one Social Media from within other social media clients. This would allow sending BBM/Twitter etc. to contacts on Facebook/Twitter/BBM etc. For example, a user could click on the Facebook friend etc. and the device would show options to send pictures/files/conversations over BBM instead of Facebook native protocol if that contact already has a BBM account, or invite to BBM if the contact does not have a BBM account.

d. Social Media: Allow any social media platform to use brand specific link to facilitate video/voice/text chats and media exchange. In this situation, the centralised identity and capability resolution server provides information necessary to determine if particular contact within BBM, Facebook etc. has a link established to the subscriber on the current device. It can also facilitate creating the link between two or more social media users.

e. Device Swap: Facilitate seamless transition of subscriber's social media accounts to a new device by auto triggering subscription for push notification on device swaps and migrating data from one device to another.

f. Push Server—Notifying when a push for a given service to a particular device should be stopped/resumed/redirected based on device events (i.e. wipe, subscriber swap, SIM swap, etc.)

g. App stores—list reviews from my contacts first when viewing an app or game. Notify me whenever one of my contacts downloads an app or game that I have.

APIs and notifications for services provided by the centralised identity and capability resolution server are made available to devices and serverside systems (service providers etc).

In an aspect, the centralised capability and identity resolution server: manages the state of the relationships between entities in the communications ecosystem; integrates with internal and external Service Providers to obtain provider specific subscriber service accounts; reacts to external events: Device Wipe, Subscriber Authentication, Device and SIM Swap, New Device Registration, etc.; notifies internal and external Service Providers and Subscriber endpoints (i.e. mobile device) when an event occurs that affects ability to deliver or obtain a service; and maintains a graph of all subscribers, devices and services in the eco system.

In order to fully utilize the power of the centralised capability and identity resolution server, each of the service providers in the ecosystem is encouraged to integrate with the centralised capability and identity resolution server. The service providers interfacing with the centralised identity and capability resolution server should:

Notify the centralised identity and capability resolution server when a new account is created/modified (including device information);

Notify the centralised identity and capability resolution server when an account is removed; and Act on ICRS notifications to suspend/resume service delivery for a particular user on a specific device.

Reference is first made to FIG. 1 which shows in block diagram of a communication system 100 in which example embodiments of the present disclosure can be applied. The communication system 100 is an example of an ecosystem in the sense described herein. The communication system 100 comprises a number of mobile electronic devices 201 which may be connected to the remainder of system 100 in any of several different ways. Accordingly, several instances of mobile electronic devices 201 are depicted in FIG. 1 employing different example ways of connecting to system 100. Mobile electronic devices 201 are connected to a wireless communication network 101 which may comprise one or more of a Wireless Wide Area Network (WWAN) 102 and a Wireless Local Area Network (WLAN) 104 or other suitable network arrangements. In some embodiments, the mobile electronic devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile electronic devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile electronic devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120, may be operated by a mobile network provider. In some embodiments, the network 124 may be realised using the internet rather than an internal or enterprise network.

A centralised identity and capability resolution server (ICRS) 300 is located within the network 124. The centralised ICRS will be described in more detail with reference to FIGS. 3 and 4. In the embodiment shown in FIG. 1, the centralised ICRS 300 tracks the device identifiers of the mobile devices 201, the computer 117, and the users of those devices. Additionally, it tracks the services and accounts accessed by each of the users of those devices and cross-references the device identifiers, account identifiers, and service identifiers with an ecosystem identifier unique to the user within the ecosystem.

The wireless network gateway 110 provides an interface between the wireless connector system 120 and the WWAN 102, which facilitates communication between the mobile electronic devices 201 and other devices (not shown) connected, directly or indirectly, to the WWAN 102. Accordingly, communications sent via the mobile electronic devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile electronic devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 14 is a personal Wi-Fi network or Wi-Fi hotspot (in which case a mechanism for securely connecting to the wireless connector system 120, such as a virtual private network (VPN), may be appropriate). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email messages, to and from a set of managed mobile electronic devices 201. The wireless connector system 120 also provides administrative control and management capabilities over users and mobile electronic devices 201 which may connect to the wireless connector system 120.

The wireless connector system 120 allows the mobile electronic devices 201 to access the network 124 and connected resources and services such as a messaging server 132 (for example, a Microsoft Exchange™, IBM Lotus Domino™, or Novell GroupWise™ email messaging server) having a global address book 134, and optionally other servers 142. The other servers 142 may comprise a content server for providing content such as internet content or content from an organization's internal servers to the mobile electronic devices 201 in the wireless network 101, an authentication server and an application server for implementing server-based applications.

The global address book 134 comprises electronic contact records generated and maintained by an IT (information technology) administrator of the network 124. Typically, the global address book is maintained exclusively by the messaging server 132 and there is no local copy on the mobile electronic device 201. In addition, the global address book typically comprises contact records for all users of the respective network 124 (e.g., enterprise). The contact records in the global address book 134 may be one or more of individual contact records (or user records) or a group address or distribution list which lists multiple individual (users).

The wireless connector system 120 typically provides a secure exchange of data (e.g., email messages, personal information manager (PIM) data, and IM data) with the mobile electronic devices 201. In some embodiments, communications between the wireless connector system 120 and the mobile electronic devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data.

The wireless network gateway 110 is adapted to send data packets received from the mobile electronic device 201 over the WWAN 102 to the wireless connector system 120. The wireless connector system 120 then sends the data packets to the appropriate connection point such as the messaging server 132, other servers 142 or application servers 136. Conversely, the wireless connector system 120 sends data packets received, for example, from the messaging server 132 or other servers 142 to the wireless network gateway 110 which then transmit the data packets to the destination mobile electronic device 201. The AP interfaces 116 of the WLAN 104 provide similar sending functions between the mobile electronic device 201, the wireless connector system 120 and network connection point such as the messaging server 132, other servers 142 and application server 136. Some embodiments of the application servers 136 provide communications services. Some embodiments of the applications servers 136 provide social networking services.

The network 124 may comprise a private local area network, metropolitan area network, wide area network, the public internet or combinations thereof and may include virtual networks constructed using any of these, alone, or in combination. Computers 117 may be connected to the network 124 directly or indirectly via an intermediate communication network such as the Internet 112. When computers 117 connect to the network indirectly, e.g. via the Internet 112, a VPN or other mechanism for securely connecting to the network 124 may be appropriate. Computers 117 may be of any suitable construction and include at least a processor, and a display screen, one or more user input devices, and a memory each connected to the processor as is known in the art. The computers 117 could be desktop computers, laptop/notebook/netbook computers, or combinations thereof, and may have wired or wireless communication subsystems for connecting to the network 124.

A mobile electronic device 201 may alternatively connect to the wireless connector system 120 using a computer 117 via the network 124. In at least some embodiments, for security purposes the computers 117 with which the mobile electronic devices 201 can connect to the wireless connector system 120 are limited to computers 117 which are directly connected to the network 124. A link 106 may be provided for exchanging information between the mobile electronic device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile electronic device 201 and computer 117. The short-range wireless communication interface may be a personal area network (PAN) interface. A personal area network is a wireless point-to-point connection meaning no physical cables are required to connect the two end points.

It will be appreciated that the above-described communication system is provided for the purpose of illustration only, and that the above-described communication system comprises one possible communication network configuration of a multitude of possible configurations for use with the mobile electronic devices 201. The teachings of the present disclosure may be employed in connection with any other type of network and associated devices that are effective in implementing or facilitating wireless communication. Suitable variations of the communication system will be understood to a person of skill in the art and are intended to fall within the scope of the present disclosure.

The system described with reference to FIG. 1 in some embodiments is a communications ecosystem according to aspects of this disclosure. In some aspects, the system of FIG. 1 is one part of a communications ecosystem.

Figure 2:
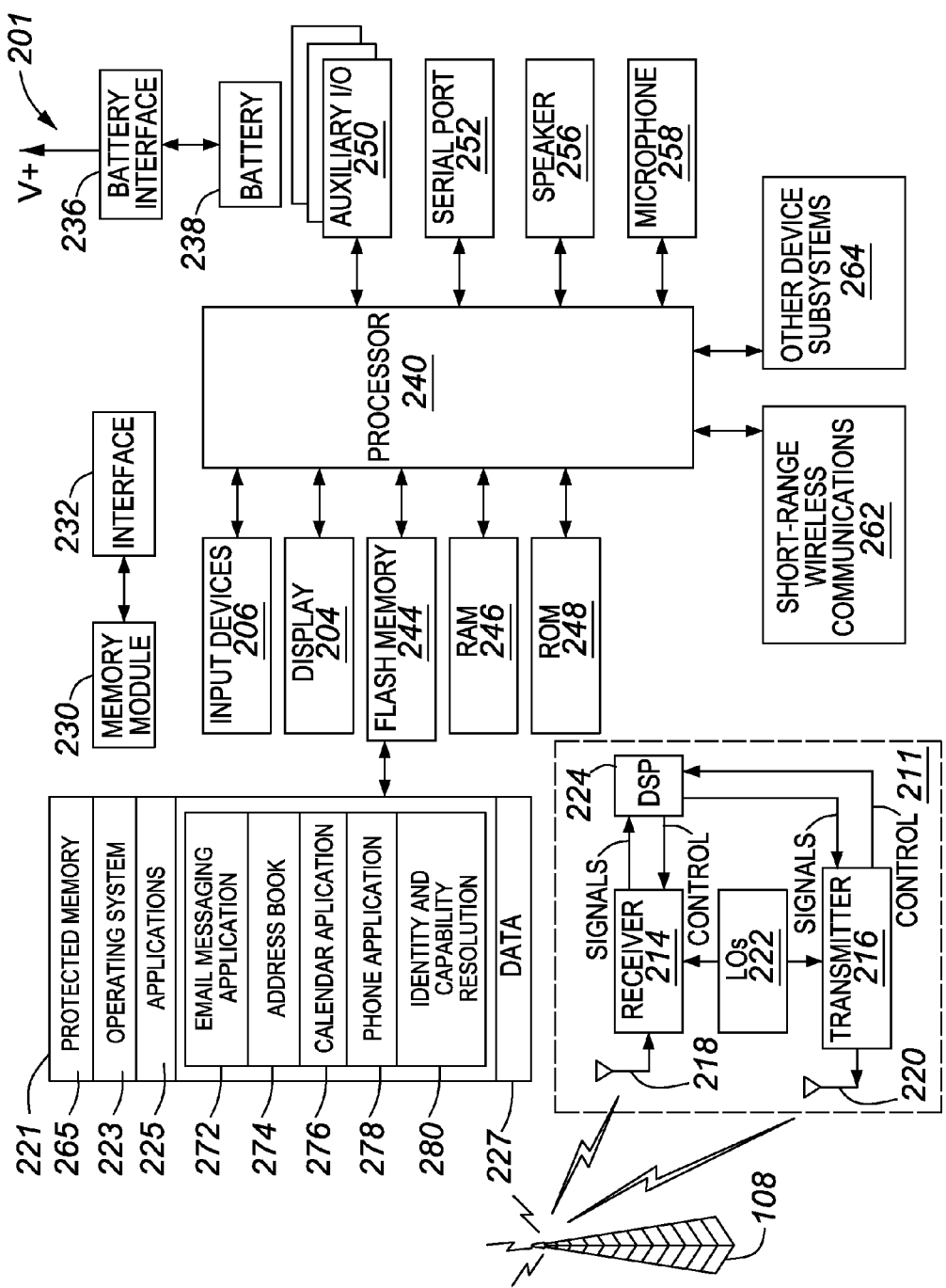
FIG. 2 is a block diagram illustrating a mobile communication device in accordance with one example embodiment of the present disclosure.

Reference is now made to FIG. 2 which illustrates an exemplary embodiment of the mobile electronic device 201 in which example embodiments described in the present disclosure can be applied. The mobile electronic device 201 is a two-way communication device having data and voice communication capabilities, and the capability to communicate with other computer systems, for example, via the Internet. Depending on the functionality provided by the mobile electronic device 201, in various embodiments the mobile electronic device 201 may be a multiple-mode communication device configured for both data and voice communication, a smartphone, a mobile telephone or a PDA (personal digital assistant) enabled for wireless communication, a tablet device or a computer system with a wireless modem.

The mobile electronic device 201 includes a rigid case (not shown) housing the components of the mobile electronic device 201. The internal components of the mobile electronic device 201 are constructed on a printed circuit board (PCB). The mobile electronic device 201 includes a controller comprising at least one processor 240 (such as a microprocessor) which controls the overall operation of the mobile electronic device 201. The processor 240 interacts with device subsystems such as a wireless communication subsystem 211 (sometimes referred to as a radio layer) for exchanging radio frequency signals with the wireless network 101 to perform communication functions. The processor 240 interacts with additional device subsystems including a display screen 204 such as a liquid crystal display (LCD) screen and a touchscreen, input devices 206 such as a keyboard, a touchpad, a fingerprint sensor and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. Some of the subsystems shown in FIG. 2 perform communication-related functions, whereas other subsystems may provide "resident" or on-device functions.

The mobile electronic device 201 may comprise a touch screen display in some embodiments. The touch screen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller. In some embodiments, a touch screen is integrated directly with the display. In still other embodiments, a touch screen is placed behind the display.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile electronic device 201 and a single antenna may be shared by both receiver and transmitter, as is known in the art. As will be apparent to those skilled in the field of communication, the particular design of the wireless communication subsystem 211 depends on the wireless network 101 in which mobile electronic device 201 is intended to operate.

The mobile electronic device 201 may communicate with any one of a plurality of fixed transceiver base stations 108 of the wireless network 101 within its geographic coverage area. The mobile electronic device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are output to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 221 stored in memory such as persistent memory, for example, in the flash memory 244. As illustrated in FIG. 2, the software modules 221 comprise operating system software 223, software applications 225 comprising an email messaging application 272 (also referred to as an email client 272), a personal address book 274, a calendar application 276, a phone application 278, and identity and capability resolution module 280. The identity and capability resolution 280 includes instructions for communicating with a centralised identity and capability resolution server. Other modules or applications running on the mobile electronic device 201 can access the identity and capability resolution 280 in order to send notifications to the identity and capability resolution server or to send queries to the identity and capability resolution server. It is recognized that the identity and capability resolution module 280 and its various components as described herein can form a discrete module running on the mobile electronic device 201, or the functions of the identity and capability resolution 280 can be distributed on the mobile electronic device 201 as separate modules or integrated within other existing modules as desired. Such discrete or distributed implementations all fall within the embodiments of the identity and capability resolution 280 as described herein.

The software applications 225 also may include a range of applications, including, for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (i.e. the display screen 204) according to the application.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

In some embodiments, the auxiliary I/O subsystems 250 may comprise an external communication link or interface, for example, an Ethernet connection. The mobile electronic device 201 may comprise other wireless communication interfaces for communicating with other types of wireless networks, for example, a wireless network such as an orthogonal frequency division multiplexed (OFDM) network or a GPS (Global Positioning System) subsystem comprising a GPS receiver or transceiver for communicating with a GPS satellite network (not shown). The auxiliary I/O subsystems 250 may comprise a pointing or navigational input device such as a touchpad, a clickable trackball or scroll wheel or thumbwheel, or a vibrator for providing vibratory notifications in response to various events on the mobile electronic device 201 such as receipt of an electronic message or incoming phone call, or for other purposes such as haptic feedback (touch feed back).

In some embodiments, the mobile electronic device 201 also includes a removable memory card or module 230 (typically comprising flash memory) and a memory card interface 232. Network access is typically associated with a subscriber or user of the mobile electronic device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile electronic device 201 in order to operate in conjunction with the wireless network 101.

The mobile electronic device 201 also stores other data 227 in an erasable persistent memory, which in one example embodiment is the flash memory 244. In various embodiments, the data 227 includes service data comprising information required by the mobile electronic device 201 to establish and maintain communication with the wireless network 101. The data 227 may also include user application data such as email messages, address book and contact information, calendar and schedule information, notepad documents, image files, and other commonly stored user information stored on the mobile electronic device 201 by its user, and other data. The data 227 stored in the persistent memory (e.g. flash memory 244) of the mobile electronic device 201 may be organized, at least partially, into a number of databases each containing data items of the same data type or associated with the same application. For example, email messages, contact records, and task items may be stored in individual databases within the device memory.

The mobile electronic device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile electronic device 201, and the battery interface 236 provides a mechanical and electrical connection for the battery 238. The battery interface 236 is coupled to a regulator (not shown) which provides power V+ to the circuitry of the mobile electronic device 201.

The short-range communication subsystem 262 is an additional optional component which provides for communication between the mobile electronic device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and voice communication applications will normally be installed on the mobile electronic device 201 during or after manufacture. Additional applications and/or upgrades to the operating system 221 or software applications 225 may also be loaded onto the mobile electronic device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile electronic device 201 and may provide enhanced on-device functions, communication-related functions, or both. For example, secure communication applications may enable electronic commerce functions and other such financial transactions to be performed using the mobile electronic device 201.

The mobile electronic device 201 may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile electronic device 201 may also compose data items, such as email messages, for example, using the input devices in conjunction with the display screen 204. These composed items may be transmitted through the communication subsystem 211 over the wireless network 101.

In the voice communication mode, the mobile electronic device 201 provides telephony functions and operates as a typical cellular phone. The overall operation is similar, except that the received signals are output to the speaker 256 and signals for transmission are generated by a transducer such as the microphone 258. The telephony functions are provided by a combination of software/firmware (i.e., the phone application 278) and hardware (i.e., the microphone 258, the speaker 256 and input devices). Alternative voice or audio I/O subsystems, such as a voice message recording subsystem, may also be implemented on the mobile electronic device 201. Although voice or audio signal output is typically accomplished primarily through the speaker 256, the display screen 204 may also be used to provide an indication of the identity of a calling party, duration of a voice call, or other voice call related information.

The phone application 278 can be split into multiple applications or sub-modules, for example one or more user phone modules and a call control module. The user phone modules provide a variety of telephony features through a user interface, while the call control module provides access to common telephony functions desired by the user phone modules, such that telephony requests from phone modules can be coordinated and so that the user phone modules do not need to each provide instructions understood by the wireless communications subsystem 211. The call control function typically makes telephony features available to user phone modules through an application programming interface (API). It is to be recognized that all or part of the phone application 278 features or functions could be provided through the operating system or otherwise distributed in the mobile electronic device 201, while continuing to fall within the term phone application 278.

Figure 3:
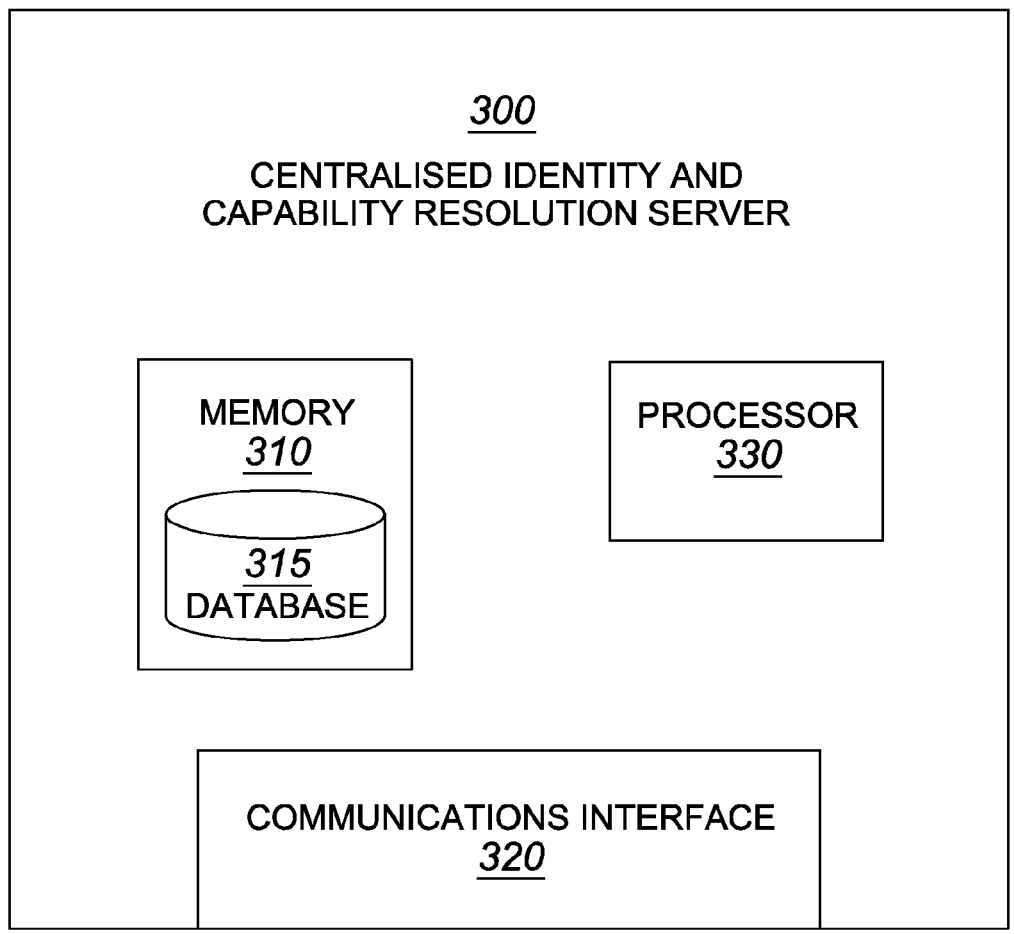
FIG. 3 is a block diagram of a centralised identity and capability resolution server according to one example embodiment of the present disclosure.

Referring to FIG. 3, a centralised identity and capability resolution server 300 will be described. The server 300 is for use in a communications ecosystem, the communications ecosystem comprising one or more electronic devices (such as, but not limited to, mobile electronic device 201) operating within one or more communication networks. The centralised identity and capability resolution server 301 includes a memory 310, a communication interface 320 and a processor 330. In some embodiments, the centralised identity and capability resolution server 300 comprises one server. In other embodiments, the centralised identity and capability resolution server 300 is implemented in a virtualized environment. Thus, although depicted as one block in FIG. 3, the centralised identity and capability resolution server 300 can be implemented across a number of devices in a cloud environment. The memory 310 has a database 315 of unique ecosystem identifiers for subscribers within a communications ecosystem stored thereon. In some embodiments the database is stored remotely from the server. Each entry in the database is for a unique ecosystem identifier comprising account information associated with the unique ecosystem identifier. In a non-limiting embodiment, the unique ecosystem identifier is a GUID (Global Unique Identifier). In some embodiments, the unique ecosystem identifier is assigned once to a user and stays with the user indefinitely regardless of change of network provider or change of device. In some embodiments, the database entry for the unique ecosystem identifier includes links or relationships that point to other identifiers associated with the subscriber for that ecosystem identifier. Non-limiting examples of the other identifiers include device identifiers and service identifiers.

The communication interface 320 for communicating with devices within the communications ecosystem. For example, notifications and queries from devices or service providers within the ecosystem are received at the server 300 through the communication interface 320. Responses to queries are sent through the communication interface. Non-limiting examples of the communication interface 320 include a receiver, a transmitter, a transceiver, and an antenna.

The processor 330 is configured to upon receiving notification through the communication interface of a new subscriber in the ecosystem, create a new database entry for a unique ecosystem identifier in the database for the new subscriber. The processor 330 is also configured to upon receiving notification of any account information associated with the new subscriber, enter the account information into the database entry. In some embodiments, an initial state of a relationship between the unique ecosystem identifier and account information is entered into the database entry.

In some embodiments, the processor 330 is further configured to notify a service provider of a change in the database affecting an account with the service provider. Non-limiting examples of the account information include a device identifier, an account identifier for service such as a social media service, an account identifier for a wireless network service, change in status of an account, change in status of a device, change in ownership of a device, change in status of a service. Non-limiting examples of services include Facebook, Scoreloop, Twitter, LinkedIn, BBM, Internet service, and wireless network service.

In some embodiments, the processor 330 is further configured to receive through the communication interface a request from a device within the ecosystem for information associated with another subscriber within the ecosystem. In some embodiments, the devices are configured to make the request from within another application running on the device. For example, while using Facebook, a request to communicate with a Facebook friend using BBM can be made without exiting Facebook or opening BBM. The centralised identity and capability resolution server will process the request by determining the ecosystem identifier for the other subscriber and using the ecosystem identifier to determine if the information requested is available in the database. For example, if the information requested is a BBM address, the server will determine if there is a BBM account associated with the ecosystem identifier for the other subscriber. In some embodiments, the server will send a notice to the other subscriber of the request. In some embodiments, the notice will include an invitation to communicate with the subscriber or an invitation to register for a service.

In some embodiments, the processor 330 is further configured to provide the device with the information associated with the other subscriber.

In some embodiments, the processor 330 is configured to notify certain subscribers of particular changes in the status of a subscriber. For example, if a device is disabled (e.g. lost or subscription with carrier ceased), subscribers identified as friends of the owner of the device could be notified that the owner in not reachable by that device. In another example, a server can be notified not to deliver messages to a disabled device.

In some embodiments, the centralised identity and capability resolution server 300 provides information based on explicit relationships between subscribers, devices, or services, or based on inferred relationships between subscribers, devices or services. In one example, a trusted relationship is inferred between multiple devices for a single subscriber. In another example, for a peer to peer service, if a change in relationship occurs between a service and a device, all devices of the subscriber are notified of the change. Alternatively, if a friend or trusted relationship is established between subscribers, notification of a change, such as the addition and activation of a new device by one subscriber, is provided to the second subscriber and one or more devices associated with the second subscriber.

In some embodiments, the processor is configured to enforce service policies for services offered in the ecosystem. For example, there may be policies associated with a vendor account such as only certain credit cards can be used, a limit on the amount that can be purchased, etc. In another example, a user can be logged in or authenticated on a maximum number of devices at one time. In another example, access to a service can be blocked depending on time of day, location, maximum time limits or other criteria.

Figure 4A:
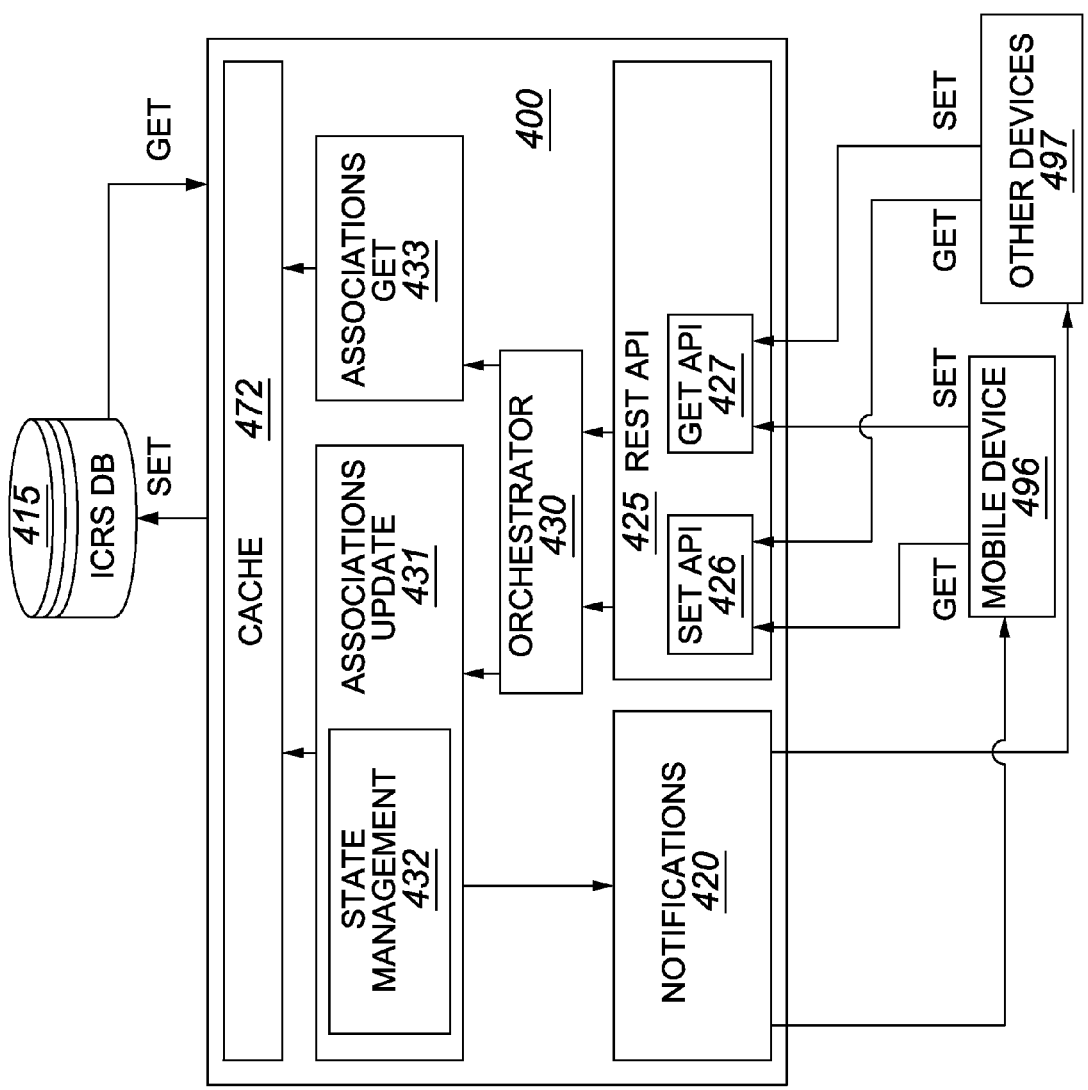
FIGS. 4A and 4B are a block diagrams of a centralised identity and capability resolution server according to example embodiments of the present disclosure.

A particular embodiment of a centralised identity and capability resolution server will now be described with reference to FIG. 4A which shows an identity and capability resolution server (ICRS) 400 in communication with an ICRS database 415, mobile devices 496, and other devices 497. In this case the database 415 is remote from the server. As mentioned above with reference to FIG. 3, the database 415 can, in some embodiments, be located in a memory on the server.

The ICRS comprise an orchestrator 430 that interacts with various components of the server. The orchestrator 430 is an example embodiment of the processor 330 described with reference to FIG. 3. The orchestrator sends associations get commands 433 and association updates 431 to the database through a cache memory 472. Nonlimiting examples of the cache memory 472 include a L2 cache or a JPA (Java Persistence API). Through a notifications module 420 the orchestrator 430 sends notifications related to the relationships to the mobile device 496 and the other electronic devices 497. The notifications module 420 in some embodiments is part of a communications interface 330 such as the one described with reference to FIG. 3. The orchestrator 430 also receives get and set commands from the mobile device 496 and the other devices 497. At the ICRS 400, the get and set commands are received by a REST (Representational State Transfer) API 425, which comprises a Set API 426 and a Get API 427. In some embodiments, the REST API 425 is part of a communications interface 330 such as the one described with reference to FIG. 3.

Figure 4B:
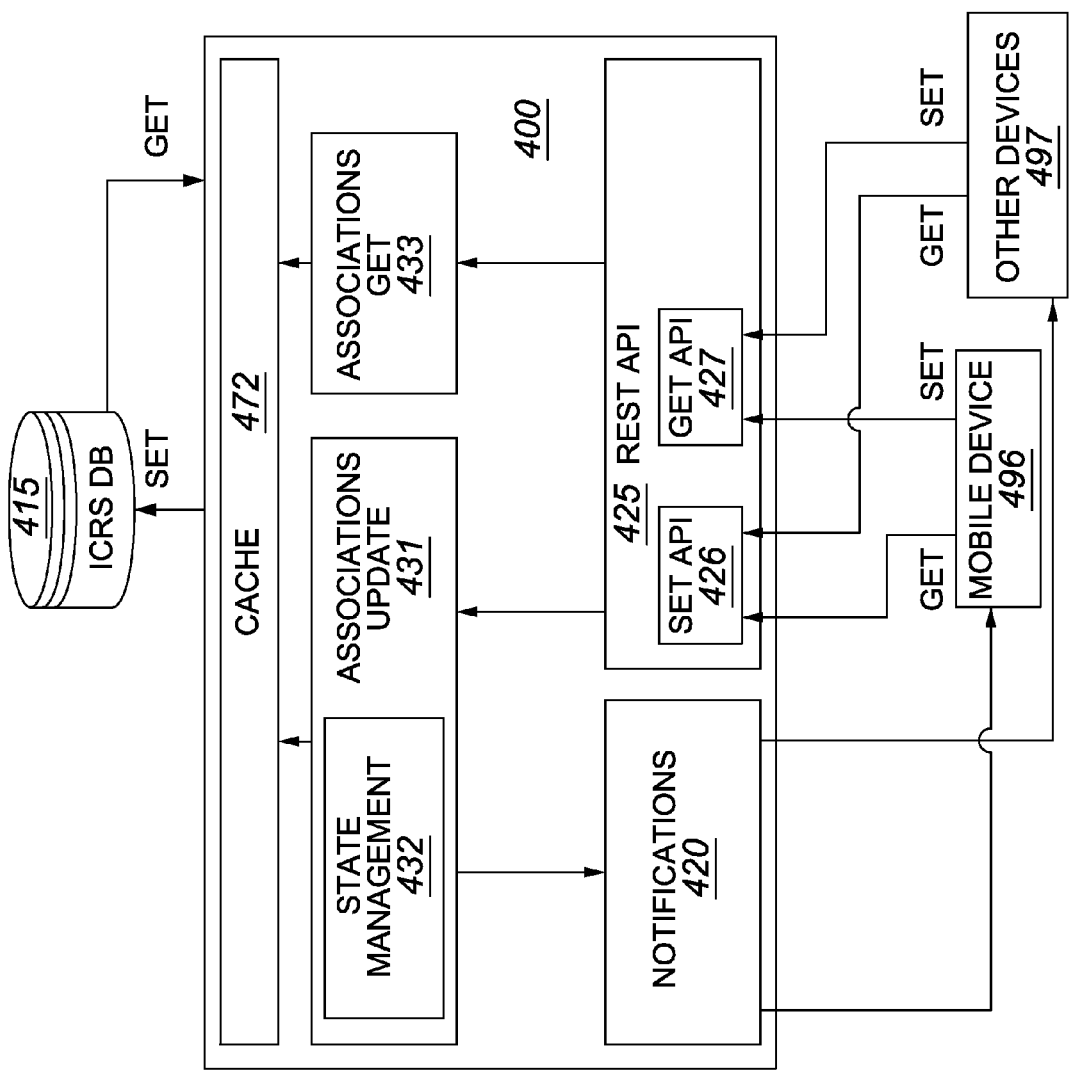

In another embodiment, as illustrated in FIG. 4B, the ICRS does not include an orchestrator and association gets 433 and association updates 431 are provided directly from the REST API 425. The notifications module 420 receives information from the state management module 432 and sends notifications related to the relationships to the mobile device 496 and the other electronic devices 497.

Figure 5:
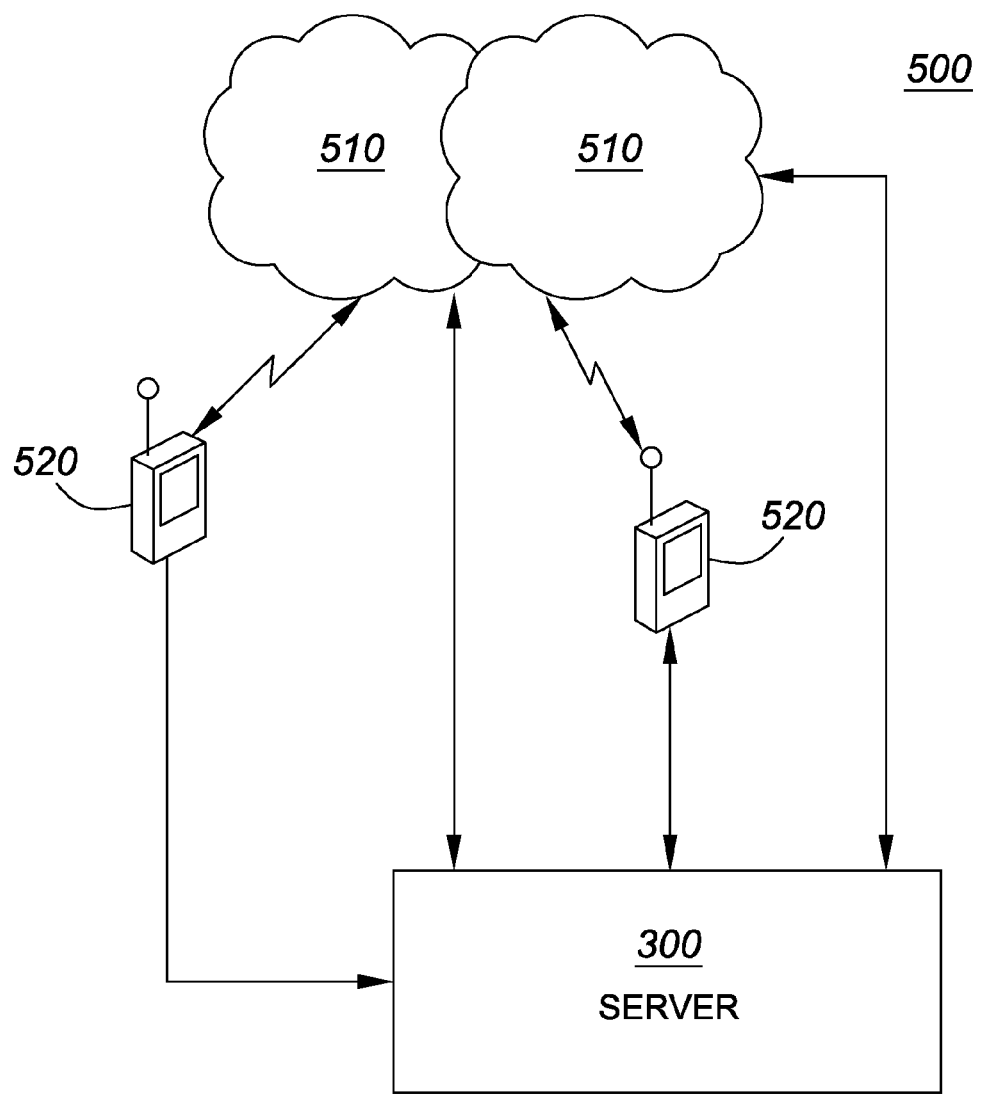
FIG. 5 is a block diagram of an ecosystem according to one example embodiment of the present disclosure.

The servers 300, 400 have been described as operating in an ecosystem. Referring to FIG. 5, a communications ecosystem 500 will now be described. The communications ecosystem 500 includes one or more networks 510, one or more electronic devices 520, and a centralised identity and capability resolution server 300. Each registered electronic device 520 is registered for service over at least one of the one or more networks 510.

At least one of the electronic devices 520 is configured to notify the centralised identity and capability resolution server 300 of any change in account information for services accessed by the at least one of the electronic devices 520. At least one of the networks 510 is configured to notify the centralised identity and capability resolution server 300 of any changes in account information within the at least one of the networks.

In some embodiment, the centralised identity and capability resolution server 300 is configured to receive account information from at least one social media service for subscribers within the ecosystem.

Figure 6:
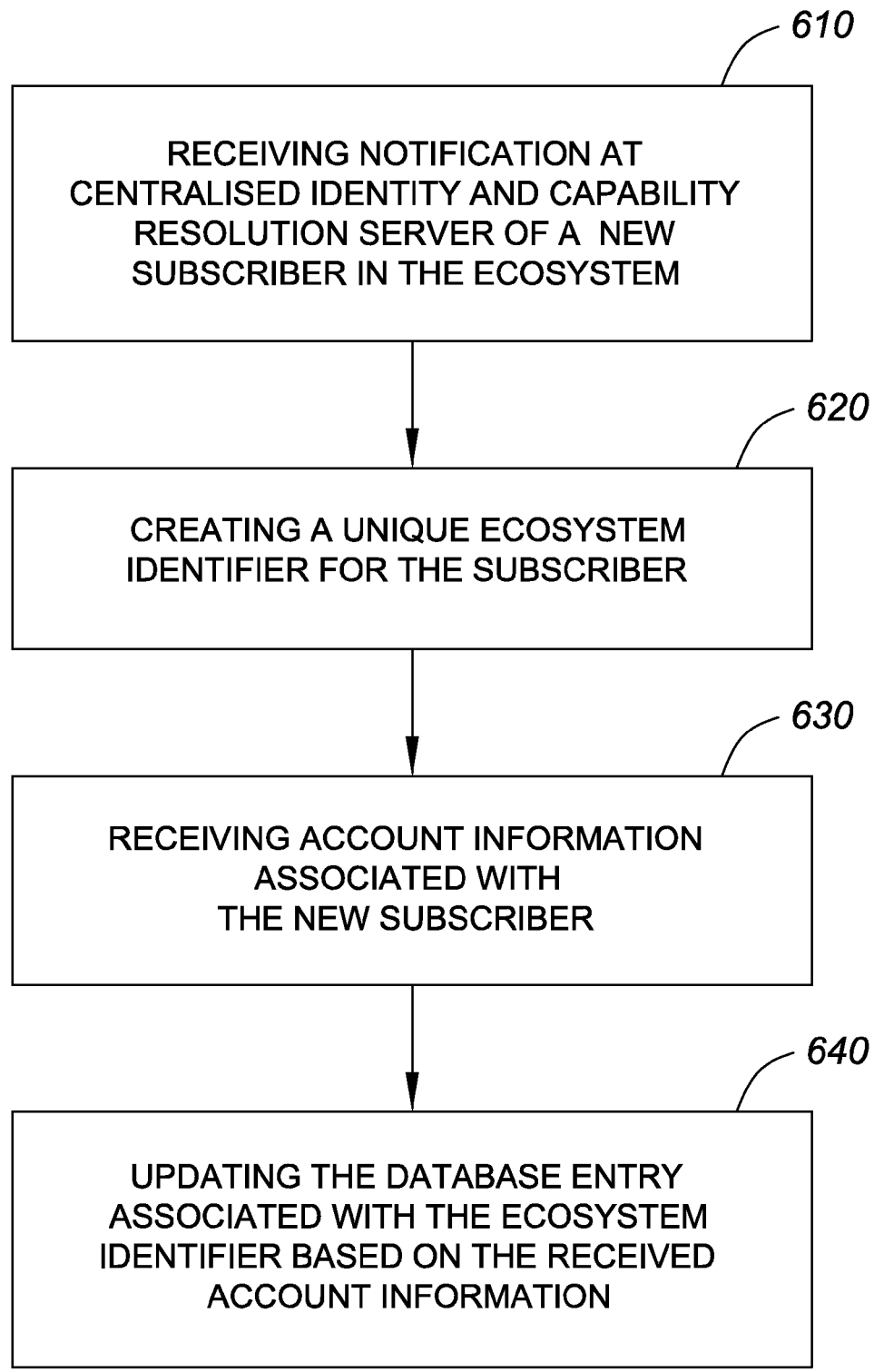
FIG. 6 is a flowchart of a method according to one example embodiment of the present disclosure.

Referring now to FIG. 6, a method of resolving capabilities and identities within a communications ecosystem will be described. The method starts with the action 610 of receiving notification at a centralised identity and capability resolution server of a new subscriber in the ecosystem. At action 620, a new database entry for a unique ecosystem identifier in a database of unique ecosystem identifiers for subscribers of services within a communications ecosystem is created. Each entry in the database for a unique ecosystem identifier comprises account information associated with the unique ecosystem identifier. Then, at action 630, the method continues with receiving notification of an account information at the centralised capability and identity resolution server for a service associated with the new subscriber. Then the method continues with updating the database entry associated with the ecosystem identifier based on the received account information (action 640).

In some embodiments, the method further comprises notifying a service provider of a change in the database affecting an account with the service provider. As described above, if a device is lost or disabled, one or more service providers may be notified in order to suspend services to the device.

In some embodiments the method further comprises receiving a request from a device within the ecosystem for information associated with a subscriber associated with another device within the ecosystem. In some embodiments the method further comprises receiving a request from a device within the ecosystem for information associated with a subscriber associated with another service within the ecosystem.

In some embodiments the method further comprises providing the device with the information associated with the subscriber associated with the other device or service.

In another aspect, there is provided a non-transitory computer readable medium having computer readable instructions stored thereon, that when executed by a processor implement any of the methods described herein.

While the present disclosure is sometimes described in terms of methods, a person of ordinary skill in the art will understand that the present disclosure is also directed to various apparatus including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon may direct an apparatus to facilitate the practice of the described methods. It is understood that such apparatus and articles of manufacture, also come within the scope of the present disclosure.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to generate alternative embodiments comprised of a sub-combination of features which may not be explicitly described above. In addition, features from one or more of the above-described embodiments may be selected and combined to generate alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A centralised identity and capability resolution server in a communications ecosystem, the communications ecosystem comprising a plurality of electronic devices operating within one or more communication networks, the centralised identity and capability resolution server comprising:

a communication interface for communicating with devices within the communications ecosystem;

a processor configured to:

maintain a database stored in a memory, the database being a database of a plurality of unique ecosystem identifiers for a respective plurality of subscribers within a communications ecosystem, each entry in the database being for a unique ecosystem identifier associated with a single respective subscriber and comprising account information associated with the unique ecosystem identifier, the account information including at least one device identifier, at least one service identifier, and at least one account identifier for the service;

maintain one or more relationship states between unique ecosystem identifiers, device identifiers, service identifiers and account identifiers;

upon receiving notification of any new account information associated with a given subscriber, enter the new account information into the database in association with the unique ecosystem identifier associated with the given subscriber; and upon receiving, from a first device associated with a first subscriber, a request for information about a second subscriber, identify whether there is a relationship between the first and second subscribers, and when there is a relationship between the first and second subscribers, identify information stored in the database about the second subscriber using a unique ecosystem identifier associated with the second subscriber, and provide the information stored in the database about the second subscriber to the first device.

2. The centralised identity and capability resolution server of claim 1, further comprising the memory.

3. The centralised identity and capability resolution server of claim 1, wherein the account information is selected from the group consisting of an account identifier for a social media service, an account identifier for a wireless network service, a change in status of an account, a change in status of a service, and any combination thereof.

4. The centralised identity and capability resolution server of claim 1, wherein the account information is selected from the group consisting of a change in status of a device, a device event, and any combination thereof.

5. The centralised identity and capability resolution server of claim 1, wherein the processor is further configured to notify a service provider of a change in the database affecting an account with the service provider.

6. The centralised identity and capability resolution server of claim 1, wherein the request from the first device is received via a first service, and the provided information about the second subscriber comprises an account identifier for the second subscriber on a second service.

7. The centralised identity and capability resolution server of claim 1, wherein the request from the first device includes a first account identifier for the second subscriber on a first service, and the provided information about the second subscriber comprises a second account identifier for the second subscriber on a second service.

8. A communications ecosystem comprising:

one or more networks;

a plurality of electronic devices, each registered for service over at least one of the one or more networks; and a centralised identity and capability resolution server comprising:

a memory having stored thereon a database of a plurality of unique ecosystem identifiers for a respective plurality subscribers within the communications ecosystem, each entry in the database being for a unique ecosystem identifier associated with a single respective subscriber and comprising account information associated with the unique ecosystem identifier, the account information including at least one device identifier, at least one service identifier, and at least one account identifier for the service;

the memory further having stored thereon one or more relationship states between unique ecosystem identifiers, device identifiers, service identifiers and account identifiers;

a communication interface for communicating with devices within the communications ecosystem; and a processor configured to:
upon receiving notification of any new account information associated with a given subscriber, enter the new account information into the database entry in association with the ecosystem identifier associated with the given subscriber; and upon receiving, from a first device associated with a first subscriber, a request for information about a second subscriber, identify whether there is a relationship between the first and second subscribers, and when there is a relationship between the first and second subscribers, identify information stored in the database about the second subscriber using a unique ecosystem identifier associated with the second subscriber, and provide the information stored in the database about the second subscriber to the first device.

9. The communications ecosystem of claim 8, wherein at least one of the electronic devices is configured to notify the centralised identity and capability resolution server of any change in account information for services accessed by the at least one of the electronic devices.

10. The communications ecosystem of claim 9, wherein at least one of the networks is configured to notify the centralised identity and capability resolution server of any changes in account information within the at least one of the networks.

11. The communications ecosystem of claim 9, wherein the centralised identity and capability resolution server is configured to receive account information from at least one social media service for subscribers within the ecosystem.

12. A method of resolving capabilities and identities within a communications ecosystem, the method comprising:
maintaining, at a centralised identity and capability resolution server, a database of a plurality of unique ecosystem identifiers for a respective plurality of subscribers within a communications ecosystem, each entry in the database being for a unique ecosystem identifier associated with a single respective subscriber and comprising account information associated with the unique ecosystem identifier, the account information including at least one device identifier, at least one service identifier, and at least one account identifier for the service;
maintaining one or more relationship states between unique ecosystem identifiers, device identifiers, service identifiers and account identifiers;
upon receiving notification of any new account information at the centralised capability and identity resolution server associated with a given subscriber, entering the new account information into the database entry in association with the ecosystem identifier associated with the given subscriber; and
upon receiving, at the centralised capability and identity resolution server from a first device associated with a first subscriber, a request for information about a second subscriber, identifying whether there is a relationship between the first and second subscribers, and when there is a relationship between the first and second subscribers, identifying information stored in the database about the second subscriber using a unique ecosystem identifier associated with the second subscriber, and providing the information stored in the database about the second subscriber to the first device.

13. The method of claim 12 wherein the account information is selected from the group consisting of, an account identifier for a social media service, an account identifier for a wireless network service, and any combination thereof.

14. The method of claim 12, wherein the account information is selected from the group consisting of a change in status of an account, a change in status of a service, a change in status of a device, a device event and any combination thereof.

15. The method of claim 12, further comprising notifying a service provider of a change in the database affecting an account with the service provider.

16. The method of claim 12, wherein the request from the first device is received via a first service, and the provided information about the second subscriber comprises an account identifier for the second subscriber on a second service.

17. The method of claim 12, wherein the request from the first device includes a first account identifier for the second subscriber on a first service, and the provided information about the second subscriber comprises a second account identifier for the second subscriber on a second service.

18. A non-transitory computer readable medium having computer readable instructions stored thereon, that when executed by a processor implement a method, the method comprising:
maintaining, at a centralised identity and capability resolution server, a database of a plurality of unique ecosystem identifiers for a respectively plurality of subscribers of services within a communications ecosystem, each entry in the database being for a unique ecosystem identifier associated with a single respective subscriber and comprising account information associated with the unique ecosystem identifier, the account information including at least one device identifier, at least one service identifier, and at least one account identifier for the service;
maintaining one or more relationship states between unique ecosystem identifiers, device identifiers, service identifiers and account identifiers;
upon receiving notification of any new account information at the centralised capability and identity resolution server associated with a given subscriber, entering the new account information into the database entry in association with the ecosystem identifier associated with the given subscriber; and
upon receiving, at the centralised capability and identity resolution server from a first device associated with a first subscriber, a request for information about a second subscriber, identifying whether there is a relationship between the first and second subscribers, and when there is a relationship between the first and second subscribers, identifying information stored in the database about the second subscriber using a unique ecosystem identifier associated with the second subscriber, and provide the information stored in the database about the second subscriber to the first device.

* * * * *